United States Patent
Bozdagi et al.

(10) Patent No.: US 6,252,975 B1
(45) Date of Patent: Jun. 26, 2001

(54) METHOD AND SYSTEM FOR REAL TIME FEATURE BASED MOTION ANALYSIS FOR KEY FRAME SELECTION FROM A VIDEO

(75) Inventors: Gozde Bozdagi, Yenisehir (TR); Robert Bryll, Chicago, IL (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/215,594

(22) Filed: Dec. 17, 1998

(51) Int. Cl.[7] ........................................... G06K 9/00
(52) U.S. Cl. ................................................ 382/107
(58) Field of Search ........................ 382/100, 103, 382/107, 190, 194, 195, 203, 236, 238, 282, 283, 268, 270, 274, 291; 348/26, 169, 180, 426, 439, 441, 572, 573, 575, 576, 577, 700, 701; 345/326, 327, 333

(56) References Cited

U.S. PATENT DOCUMENTS

| | | | |
|---|---|---|---|
| 5,557,684 | * 9/1996 | Wang et al. | 382/107 |
| 5,767,922 | * 6/1998 | Zabih et al. | 348/700 |
| 5,784,115 | 7/1998 | Bozdagi | 348/452 |
| 5,923,365 | * 7/1999 | Tamir et al. | 348/169 |
| 5,943,445 | * 8/1999 | Dufaux | 382/236 |
| 6,037,988 | * 3/2000 | Gu et al. | 375/240 |

FOREIGN PATENT DOCUMENTS 0 690 413    1/1996  (EP) .............................. G06T/7/20

OTHER PUBLICATIONS

V. Kobla, et al., "Archiving, indexing, and retrieval of video in the compressed domain", Proceedings of the SPIE—The International Society for Optical Engineering, vol. 2916, pp. 78–89 (1996).

A.M. Ferman, et al., "Object–based indexing of MPEG–4 compressed video", Proceedings of the SPIE—The International Society for Optical Engineering, vol. 3024, pt. 2, pp. 953–963 (1997).

W. Zhou et al, "Real–time content–based processing of multicast video", Conference Record of the 32nd Asilomar Conference on Signals, Systems, and Computers, vol. 1, pp. 882–886 (IEEE, Piscataway, NJ, 1998).

T.S. Huang, et al., "Human facial motion modeling, analysis, and synthesis for video compression", Proceedings of the SPIE—The International Society for Optical Engineering vol. 1605, pp. 234–241 (1991).

F. Quek, R. Bryll, "Vector Coherence Mapping: A Parallelizable Approach to Image Flow Computation", Proceedings/International Conference on Computer Vision 1998 (ACCV'98) (Jan. 8–10, 1998, Hong Kong), pp. 591–598.

Bergen, James R., Burt, Peter J., Hingorani, Rajesh, Peleg, Shmuel. "A Three–Frame Algorithm For Estimating Two–Component Image Motion",: *IEEE Transactions On Pattern Analysis and Machine Intelligence*, vol. 14, No. 9, Sep. 1992, pp. 886–896.

* cited by examiner

*Primary Examiner*—Andrew W. Johns
*Assistant Examiner*—Shervin Nakhjavan
(74) *Attorney, Agent, or Firm*—Fay, Sharpe, Fagan, Minnich & McKee, LLP

(57) ABSTRACT

A method and system for real time converting a dynamic video to a set of static image frames includes segmenting the video into a plurality of frames. Significant parts of the frames are selected to comprise interest points. An operator estimates a motion trajectory of the interest points for real time computing of a global motion. Upon detection of global motion, selected key frames are selected from the set of static frames to represent the dynamic video. Interest points are identified as areas of high gradient and are further minimized by limiting interest points by imposing a grid on image frame and limiting the interest points to one point per grid cell.

17 Claims, 3 Drawing Sheets

METHOD AND SYSTEM FOR REAL TIME FEATURE BASED MOTION ANALYSIS FOR KEY FRAME SELECTION FROM A VIDEO

FIELD OF THE INVENTION

The present invention relates to a conversion of dynamic video data to a representative compilation of static frames comprising selected important information within the dynamic video. Such a compilation not only consumes a smaller memory space but can provide a convenient index into the dynamic video. More specifically, the present invention relates to the real time selection of key static frames from a portion of the dynamic video comprising a global motion by the limiting of the data processing to only significant interest points of the video.

BACKGROUND OF THE PRESENT INVENTION

Dynamic to static conversion of video data includes representing the dynamic media (video, animations) with a number of still images which carry selected important information within the dynamic media. For example, in the case of a video consisting of a pure pan or zoom sequence (i.e., global motion), the efficient representation may contain the beginning, middle and end frames of the pan or zoom. In the case of a commercial video consisting of short clips of different products manufactured by a company, the efficient representation may contain a single image from each product shown in the video. Although, it would be easy for an operator to find these images if the operator watched the whole video, such an editorial distillation is very time consuming. Accordingly, there is a substantial need for a method and system which can analyze dynamic media information in real time for purposes of selecting key frames acceptably representative of the dynamic media.

The subject invention is thus more particularly applicable to an improved real time selection method for a plurality of key frames from scenes comprising global motion within the dynamic video.

The key problem in selection of the key frames is to estimate the global motion between frames. Time domain global motion estimation techniques can be classified into three groups, feature correspondence methods, optical flow methods and direct methods. Feature correspondence requires a number of point correspondences among two or three frames to be known or estimated a priori. The motion parameters are computed from these correspondences. The other two methods do not require determination of distinct feature points, but instead utilize the optical flow constraint in between two corresponding views. The optical flow methods consist of two steps: the estimation of the optical flow field, and recovering the motion parameters using this estimated optical flow. On the other hand, direct methods utilize only the spatio-temporal image intensity gradients to estimate the motion. Many motion estimators in each of these categories have been proposed in the literature; however, all of these methods have some drawbacks and are exclusively designed for off-line computations. (J. Bergen, P. Hurt, R. Hingorani and S. Peleg, "A Three-Frame Algorithm for Estimating Two-Component Image Motion", IEEE Trans. Pattern Analy. Machine Intell, vol. 14, no.9, pp. 886–896, September 1992.)

The amount of data involved for identifying the particular values for all the pixel locations in a dynamic video makes any of the above prior art methods impractical for computing real time motion estimations for assessing representative static key frames for a dynamic video. Accordingly, there is also a need for a method that can reduce the necessary computation so that it can be done in real time and thereby avoid the disadvantages of delayed off-line computations.

The present invention contemplates a new and improved method and system which overcomes the above referenced problems and others to provide a new method for identification of a global motion in a dynamic video wherein the underlying computations can be accomplished in real time for the generation of a plurality of key static frames representative of the global motion portion of the video.

BRIEF SUMMARY OF THE INVENTION

In accordance with the present invention, there is provided a method of real time converting a dynamic video to a set of static key frames representative of a global motion portion of the dynamic video comprising the steps of digitizing the dynamic video into a temporal sequence of static image frames, designating significant parts of the frames to comprise interest points; identifying a global motion by tracking interest point motion trajectories with real time computing of changes to the interest points and selecting from the frames including the global motion, key frames comprising a set of static frames representative of the dynamic video. The significant parts preferably comprise those parts or edges of an image frame within the video that include areas of high gradient. The interest points subject to computation are further reduced by partitioning the frames within a distribution grid and selecting only one interest point within each grid cell. Thus, by merely computing the differences in the minimized interest points, i.e., at a reduced number of pixels, the computation time can be minimized and expedited for real time processing of the dynamic video into a set of static frames.

In accordance with another aspect of the present invention, the identifying global motion comprises estimating a constant intensity of the interest points along a motion trajectory in a predetermined time period. The estimating includes representing the motion trajectory with a plurality of affine parameters from a selected optical flow equation. Changes in the affine parameters are compared with a preselected threshold for purposes of assessing whether or not the global motion is occurring. When global motion is detected, the key frames are selected by capturing the frames at a predetermined rate during the time period of the global motion.

One benefit obtained by use of the present invention is the ability to contemporaneously compare, with the receiving of the stream of video data, pixel values of the interest points, for real time selection of the key frames.

Another benefit obtained by the present invention is the method of selecting interest points from all of the available pixels in a frame to facilitate the real time computation by limiting the interest points to areas of preselected significance, such as those having a high gradient that signify edge portions, like a black-to-white transition. The interest points are further limited by dividing the frame into a grid and selecting only a single interest point for each grid cell. By assessing changes in the value of interest points with a conventional processing operator for estimating error, interest points distributed throughout the entire frame can be monitored for purposes of identifying the global motion.

Other benefits and advantages for the subject new method and system will become apparent to those skilled in the art upon a reading and understanding of the specification.

BRIEF DESCRIPTION OF THE DRAWINGS

The invention may take physical form in certain parts and steps and arrangements of parts and steps. The preferred and alternative embodiments of which will be described in detail in the specification and illustrated in the accompanying drawings which form a part hereof and wherein.

Detailed Description of the Invention

Figure 1:
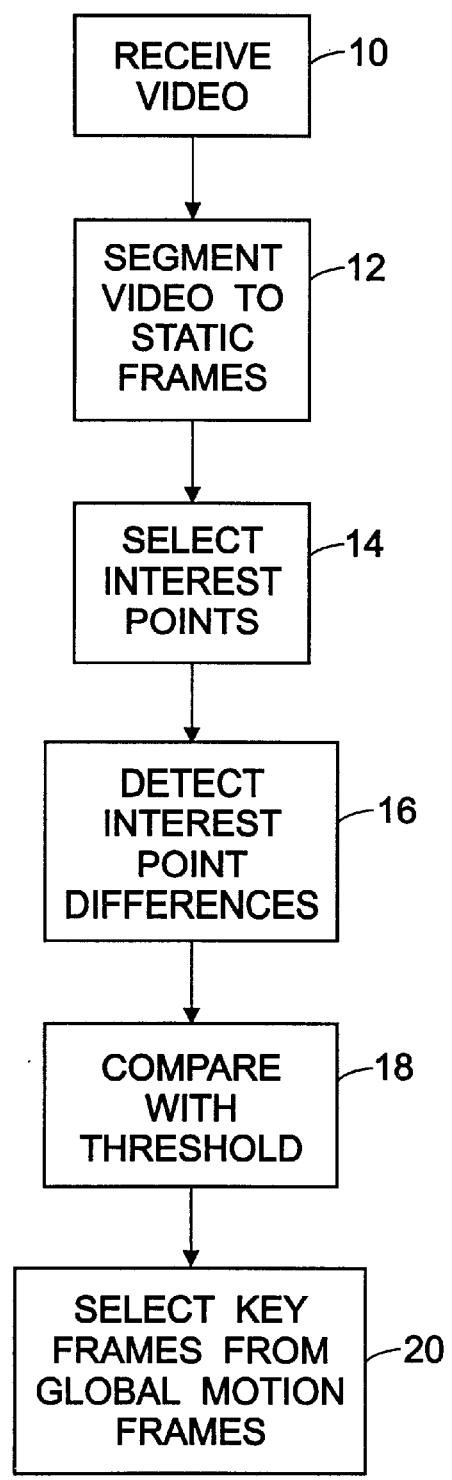
FIG. 1 is a flowchart of the processing method of the subject invention.

Referring now to the drawings which are shown for purposes of illustrating preferred embodiments of the invention only and not for purposes of limiting same, the subject invention is directed to a method and system for generating a smaller, static representation, i.e., a document compilation, of a dynamic video. Such a compilation has substantial advantages relating to memory space consumption, ease and convenience in handling and can also provide a convenient index into the original dynamic video database. The subject invention is particularly directed to generating the static frame compilation for a particular portion of the dynamic video, i.e., that portion generally comprising global motion of the video image such as a panoramic scanning, zooming or tracking of the image. As noted above, the pixel data that changes over time to comprise the global motion can comprise such a large amount of data that it becomes impractical to try to monitor changes in all the pixel data. However, the invention exploits the fact that not all such changes are necessary to obtain a satisfactory static representation of the overall global motion when only a relatively few, selected key frames need be culled from the overall dynamic video to provide an adequate representation of the complete global motion involved.

Another important aspect to note in the course of the description of the invention, is that the processing for identifying selected key frames, is accomplished in real time, i.e., essentially contemporaneous with the acquisition of the original dynamic video data itself. This overcomes the notorious prior problem of acquiring and storing a prolix amount of video data and processing the data off line over an extended period of time to identify key frames, as was done in the prior art systems.

With particular reference to FIG. 1, a flowchart of the processing method for the subject invention is illustrated. In the first step the method comprises receiving 10 the dynamic video and breaking up the video stream into distinct segments by digitizing 12 the video into a temporal sequence of static image frames where each image frame comprises a two dimensional coordinate array of a number of digitized picture elements or pixels having associated pixel signal levels corresponding to a scene content.

Figure 2:
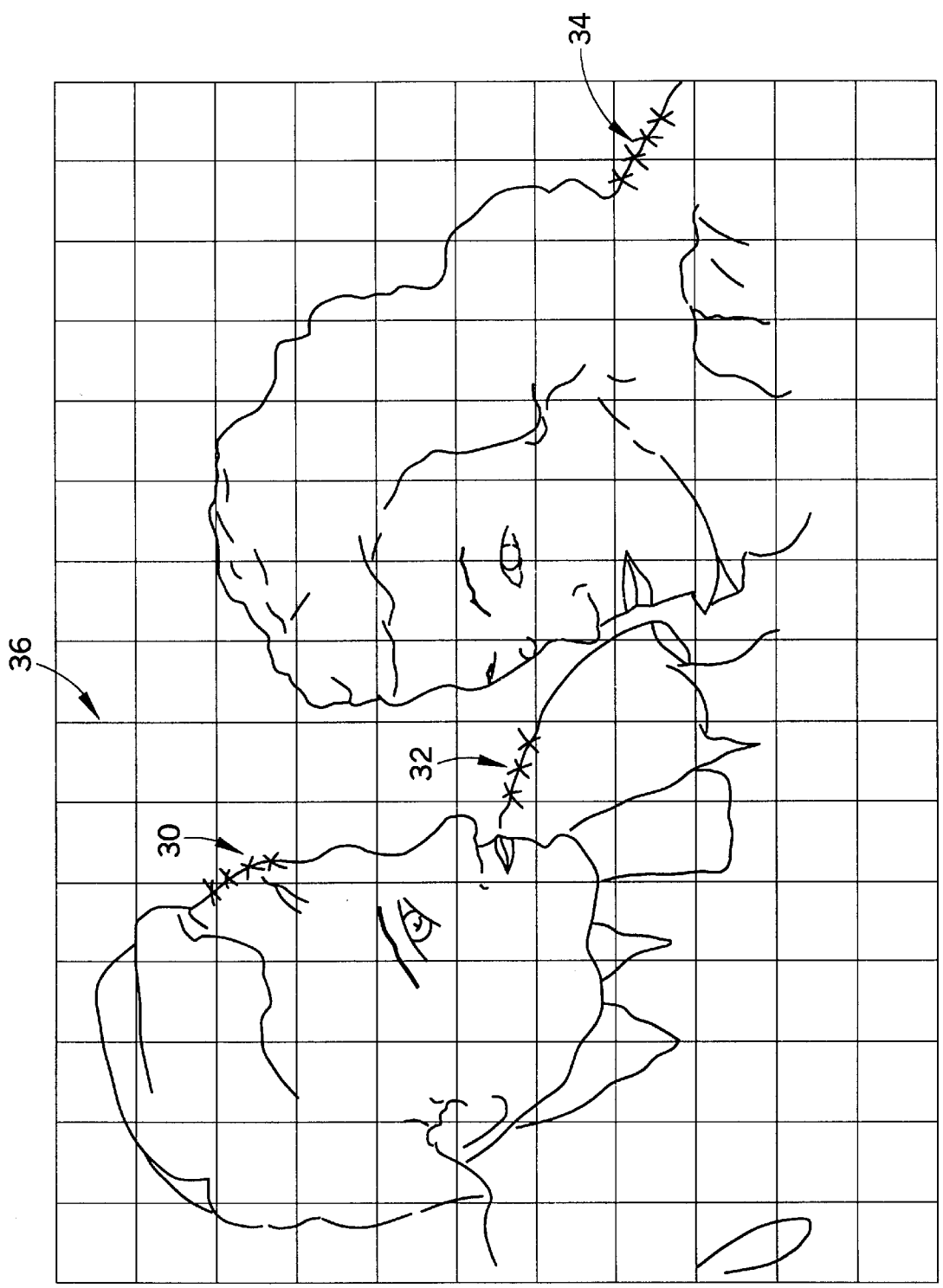
FIG. 2 is a stylized static frame particularly illustrating selected interest points.

FIG. 2 is an overly simplistic illustration of a digitized static image frame showing two individuals, but is adequate for conveying the principals of the present invention. The frame of FIG. 2 is comprised of a plurality of pixels each having a digital value. Most prior art systems for motion estimation required processing of the pixel data for the overall image. The subject invention has the important feature of reducing the computation time by identifying pixel data differences for only a portion of the whole of the image wherein the selected differences are used to estimate the global motion so that the computation can be done in real time. A key notion is to only look at parts of the image that are not only easy to observe, but are also highly probable indicators of motions, and ultimately global motions when tracked over a selective period of time. Accordingly, the third step in the method of FIG. 1 is selecting 14 the appropriate interest points.

With reference to FIG. 2, edge lines of the people in the image comprise high gradient areas which are easily identified with conventional difference operators to identify pixel locations comprising the interest points. For example, areas 30, 32 and 34 marked with "x's" on the image edge lines all comprise a part of the total of the interest points that can be identified in the image frame of FIG. 2. It is important to note that the interest points are intended to be indicative of global motion over time. Motion estimation operators typically depend on image derivatives so the high gradient point locations are selected as convenient factors of this type of processing computation. The high gradient points are obtained with a conventional difference operator [not shown] and the results are thresholded to obtain all possible candidates for the ultimately selected interest points. A post processor essentially positions a grid 36 over the whole of the image and reduces the number of candidates to a single interest point within each grid cell or square, so that it not only reduces the overall number of interest points, but assures a uniform distribution of the interest points over the image. The grid is applied over the whole of the image so that the interest points that are identified at 30, 32 and 34 would be likely candidates as selected interest points. Each cell of the grid is preferably composed of 8×8 pixels but other grid sizes are possible.

Keeping in mind, that the overall objective of the invention is to identify a global motion of the image, not whether if just one object in the picture is moved, the limitation of interest points to one interest point for each cell of the grid 36 provides satisfactory interest point distribution and avoids intense clustering of interest points.

Once the interest points have been selected, the next important step in the method (FIG. 1) is detecting 16 if the interest points differ in their composition over time. More specifically, a motion estimation operator is employed to track a motion of the interest points, i.e., an optic flow, over time. In the actual computation, the global motion is detected by a motion estimation operator which tracks a motion trajectory by estimating constant intensity along the trajectory and, more particularly, by defining the error in the estimation of the optical flow equation. The equation below comprises a conventional motion estimation operator wherein it is assumed that the global motion can be represented by six affine parameters. Again, assuming that the pixel data intensity remains constant along a motion trajectory, the error in the optical flow equation is defined as:

$$\sum_{(x,y)\in s} (I_x(a_0 + a_1 x + a_2 y) + I_y(a_3 + a_4 x + a_5 y) + I_t)^2 \qquad (1)$$

where $I_x$, $I_y$ show the image derivatives in x and y directions, respectively; It shows the pixel difference between frames at times t and t+1; S shows the set of the image pixels used in the calculations; $a_0$ and $a_3$ represent the horizontal and vertical translations; $a_1$, $a_2$, $a_4$, $a_5$ represent rotation and the uniform scaling. The affine parameters $a_0$–$a_5$ are basically coefficients of a transform that essentially operates to compute a minimal error for an optical flow that will allow tracking of the translation, scaling and rotation of the pixel data of the selected interest points. In other words, by computing zero error values for the affine parameters between pixel data differences between two images over time, the motion between the images can be tracked, and when applied to a threshold can be used to determine if global motion is occurring. Keeping in mind that the set "S" represents all the possible pixel location interest points which could be subject to calculations, and for entire image data frame would comprise an impracticably large amount of data, the minimization of Equation 1 to Equation 2 with respect to the affine parameters and for a set of interest points "B" substantially reduces the computation required for solving Equation 2 below and gives an estimate for the affine parameters.

$$\begin{bmatrix} \sum_B I_x^2 & \sum_B I_x^2 x & \sum_B I_x^2 y & \sum_B I_x I_y & \sum_B I_x I_y x & \sum_B I_x I_y y \\ \sum_B I_x^2 x & \sum_B I_x^2 x^2 & \sum_B I_x^2 xy & \sum_B I_x I_y x & \sum_B I_x I_y x^2 & \sum_B I_x I_y xy \\ \sum_B I_x^2 y & \sum_B I_x^2 xy & \sum_B I_x^2 y^2 & \sum_B I_x I_y y & \sum_B I_x I_y xy & \sum_B I_x I_y y^2 \\ \sum_B I_x I_y & \sum_B I_x I_y x & \sum_B I_x I_y y & \sum_B I_y^2 & \sum_B I_y^2 x & \sum_B I_y^2 y \\ \sum_B I_x I_y x & \sum_B I_x I_y x^2 & \sum_B I_x I_y xy & \sum_B I_y^2 x & \sum_B I_y^2 x^2 & \sum_B I_y^2 xy \\ \sum_B I_x I_y y & \sum_B I_x I_y xy & \sum_B I_x I_y y^2 & \sum_B I_y^2 y & \sum_B I_y^2 xy & \sum_B I_y^2 y^2 \end{bmatrix} \begin{bmatrix} a_0 \\ a_1 \\ a_2 \\ a_3 \\ a_4 \\ a_5 \end{bmatrix} = \begin{bmatrix} -\sum_B I_x I_t \\ -\sum_B I_x I_t x \\ -\sum_B I_x I_t y \\ -\sum_B I_y I_t \\ -\sum_B I_y I_t x \\ -\sum_B I_x I_t y \end{bmatrix} \quad (2)$$

The effect of the minimization of Equation 1 into Equation 2, means that only the selected interest points comprising areas of high gradient are subjects of the computation, and eliminates from the overall calculation and computation, all the points from the image that are not interest points. Such a reduction allows for real time computation of motion estimation, the detection of the desired global motion and ultimately the selection of the key frames.

Step 18 (FIG. 1) comprises the last computation step and comprises thresholding the affine parameters for comparing them with previous estimates over a selected time period to determine whether there is global motion or not. Thresholding values are selected empirically and the effect is to minimize the noise. A comparison determines whether the estimated motion follows a pattern or not. If a pattern is detected than the system captures the frames at a preselected rate of frames per second until the end of the motion. Such a capture comprises selecting 20 key frames from the global motion frames. An acceptable capture rate is four frames per second until the end of the global motion.

Figure 3:
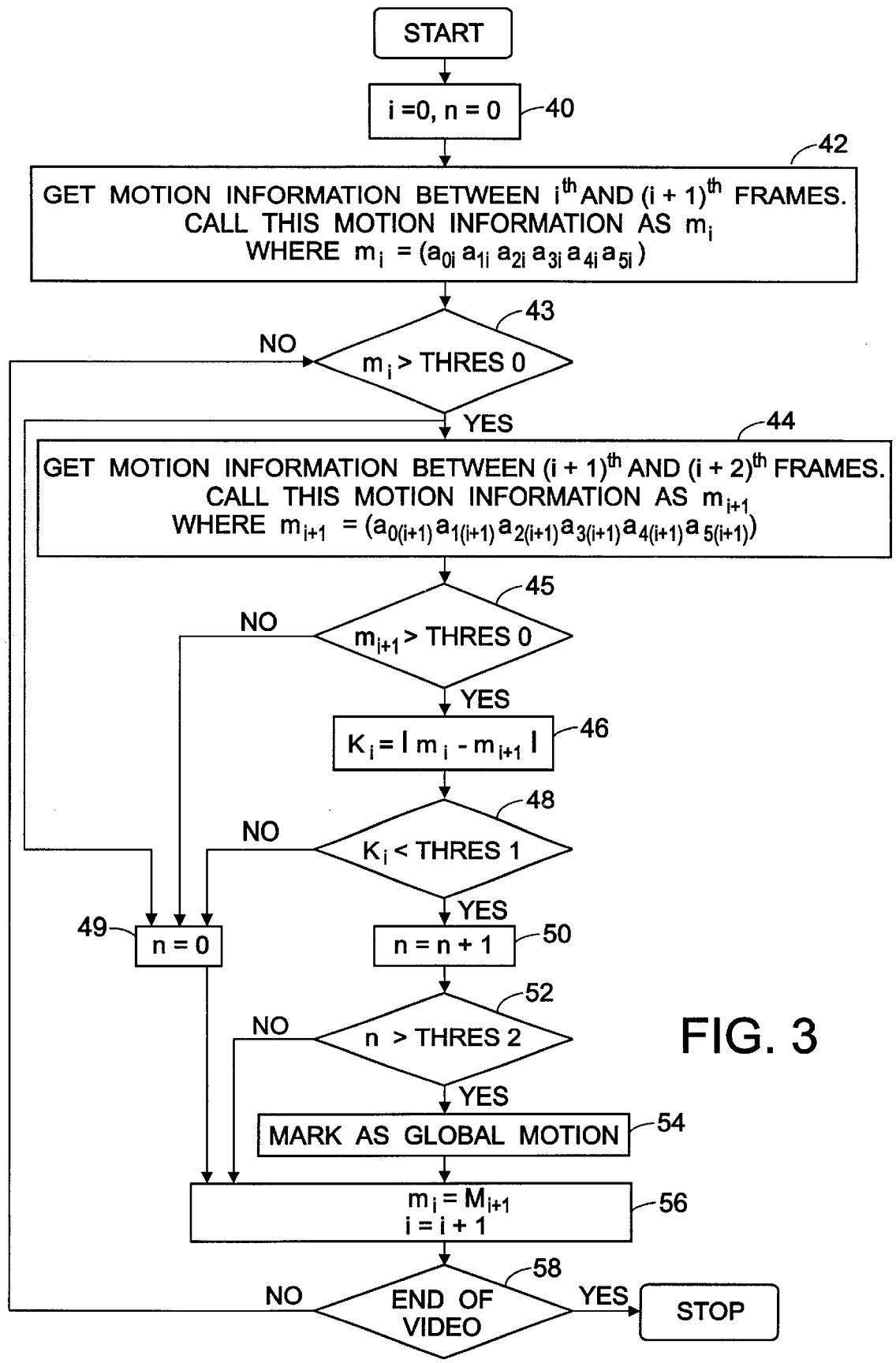
FIG. 3 is a flowchart of the processing method of the key frame selection process.

With particular reference to FIG. 3, a flowchart is provided to describe the steps for computing the differences in motion vectors between consecutive frames. At step 40 the computation process is initialized where "i" represents the frame number and "n" represents the number of frames over which the global motion is assessed. At step 42, the motion information $m_i$ is computed between subsequent frames and thresholded by Thres0 at step 43. At step 44 the motion information is computed for the very next frame and thresholded by Thres0 at step 45. Such a thresholding determines whether there is sufficient motion between frames so that these frames can be considered to be under global motion. At step 46 a difference computation $K_i$ is performed and if the difference in motion vectors is less than a predetermined threshold, Thres1 as shown at step 48, then it is known that there is a possibility that global motion exists. However, since the threshold computation might be due to noise too, it is necessary to keep another parameter in order to detect whether the motion lasts over a certain number of frames (parameter n). If n is above a certain threshold, Thres2, which is also a preselected value, then the system will indicate a detection of a global motion pattern. Accordingly, at step 50, n is incremented and a comparison is made at step 52 to determine if the number of frames that have been evaluated is greater than the preselected threshold, Thres2. If so, then a global motion is detected 54. Alternatively, if Thres1 is not satisfied, then n is reinitialized 49, and if the appropriate number of frames has not been evaluated so n is less than Thres2, then motion information between the next incremented frame is performed 56. All areas of motion information in the video can then be identified until the end 58 of the video. In one preferred embodiment, Thres2 was selected as 7 when the video was processing 20 frames/sec.

Combining this inventive technique with a scene cut processor for the overall video data allows an operator to capture more than a single frame in the case of a global motion and only a single frame when there is no motion or just local motion to provide an adequate compilation of selected key frames representative of the overall dynamic video.

The subject global motion and identification method can be combined with a scene cut detection algorithm based on an associated histogram and pixel difference. Such a detection algorithm can first analyze the histogram and the frame differences so if they are both above a certain threshold, then the frame is identified as a key frame. If they are below a threshold, then the motion information is analyzed using the subject invention so that if a global motion is detected, then more than a single frame is selected as a key frame. The overall combination allows distillation of the dynamic video to scene cuts and selected key frames of global motion so that the key frames can comprise panning, zooming and abrupt scene cuts.

The present invention has been described with reference to various embodiments in detail. It is intended that various modifications can be implemented without departing from the spirit of the present invention. For example, although the preferred embodiment has been mentioned with respect to generating document embodiments instead of images such as may be described with respect to a printing system, the invention is also applicable and readily implementable in a display system. Moreover, the invention can be readily implemented on an ASIC, programmable gate array, or in software, thereby enabling the placement of this process in a scanning device, electronic subsystem, printer or display device. In addition, it is contemplated that the present invention is implementable in a processing system wherein a video is in a suitable range to identify high gradient interest points and as such is applicable to any rendering system, not necessarily a binary or digital processing system.

In particular, the concept of the present invention are readily applicable to a color environment as well as a monochrome or black/white environment.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described the invention, we now claim:

1. A method of real time converting a dynamic video to a set of static image frames comprising steps of:
   digitizing the video into a plurality of frames;
   automatically selecting in real time significant parts of the frames comprising interest points, wherein the selecting significant parts comprises distributing the interest points through each of the frames;
   identifying a global motion by real time computing of changes to the interest points; and,
   selecting from the frames including the global motion, key frames comprising the set of static frames representative of the dynamic video.

2. The method of claim 1 wherein the selecting significant parts comprises identifying an area of high gradient.

3. The method of claim 1 wherein the distributing includes dividing the frames into a grid of frame cells.

4. The method of claim 3 wherein the selecting significant parts comprises selecting a single interest point per cell portion.

5. The method of claim 1 wherein the identifying a global motion comprises estimating a constant intensity of an interest point along a motion trajectory in a predetermined time period.

6. The method of claim 5 wherein the estimating includes representing the motion trajectory with a plurality of affine parameters of a selected optical flow equation.

7. The method of claim 6 wherein the estimating includes thresholding the affine parameters.

8. The method of claim 7 wherein the estimating includes a comparing of the affine parameters after the thresholding for detecting a pattern representative of the global motion.

9. The method of claim 8 wherein the selecting the key frames includes capturing the frames during a detected pattern at a predetermined rate during a time period of the global motion.

10. The method of claim 1 wherein the identifying the global motion includes identifying video sequences comprising panning, zooming and abrupt scene cuts.

11. A method of selecting key frames from a video whereby the key frames will comprise a sequence of static images representative of the video, including steps of:
    receiving a stream of data into a processing device wherein the stream is representative of the video;
    segmenting the stream into a sequence of frames comprising pixels corresponding to an image of the video;
    selecting certain pixels from the frames associated with significant features of the image;
    comparing the certain pixels over a selected time period for identification of a global motion; and,
    selecting the key frames from the sequence of frames based upon the identified global motion.

12. The method as described in claim 11 wherein the comparing of the certain pixels is contemporaneous with the receiving of the stream of data for real time selecting of the key frames by the processing device.

13. The method as described in claim 12 wherein the selecting certain pixels comprises identifying pixels having a high gradient difference from adjacent pixels.

14. The method as described in claim 12 wherein the comparing comprises computing an error estimation of a constant pixel intensity along a motion trajectory.

15. The method as described in claim 14 wherein the computing includes thresholding the error estimations.

16. A system for converting a video into a representation thereof comprised of a compilation of static key frames, including:
    means for segmenting the video into a plurality of static frames comprised of a plurality of pixels;
    means for selecting significant interest pixels from the plurality;
    means for determining from the significant interest pixels whether a successive set of the static frames is imaging a global motion; and,
    means for selecting the static key frames from the static frames based upon the determined global motion.

17. The system as defined in claim 16 wherein the means for selecting significant interest pixels includes means for identifying pixels at high gradient locations.

* * * * *